Feb. 26, 1957 J. J. PARKER ET AL 2,782,521
TOOL FOR GAUGING THREADS ON WORK PIECES
Filed Aug. 21, 1953 3 Sheets-Sheet 2
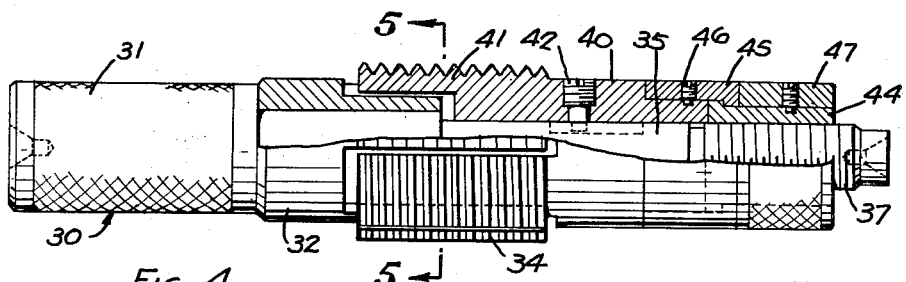
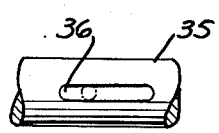
Fig. 6
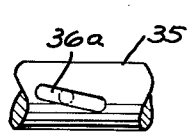
Fig. 7
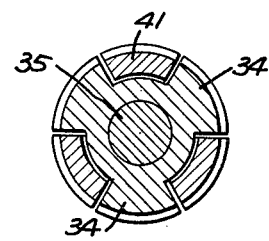
Fig. 5
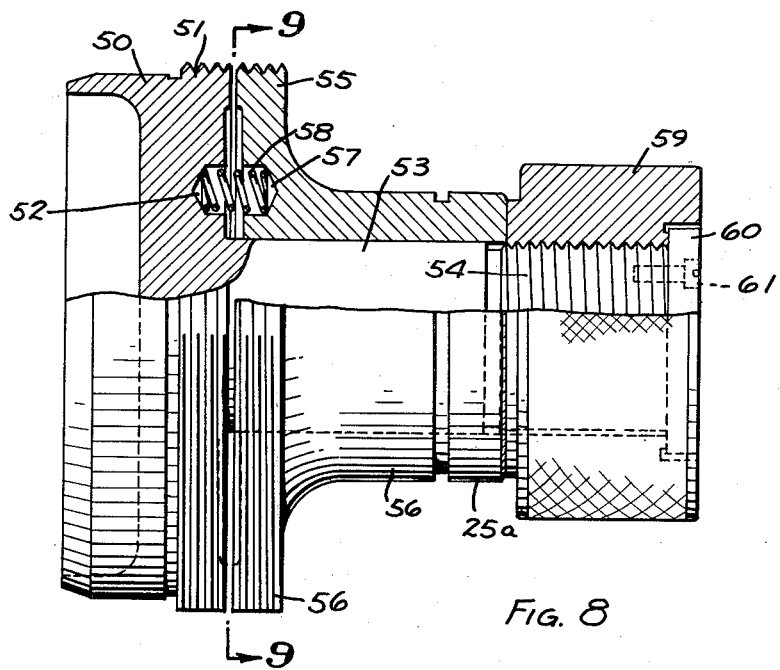
Fig. 8
INVENTORS
JOHN J. PARKER &
LONDON T. MORAWSKI.
BY Barnes, Kisselle, Laughlin & Raisch
ATTORNEYS.

Feb. 26, 1957 J. J. PARKER ET AL 2,782,521
TOOL FOR GAUGING THREADS ON WORK PIECES
Filed Aug. 21, 1953 3 Sheets-Sheet 3

INVENTORS
JOHN J. PARKER &
LONDON T. MORAWSKI.
BY Barnes, Kisselle, Laughlin & Raisch

ATTORNEYS.

United States Patent Office 2,782,521
Patented Feb. 26, 1957

2,782,521
TOOL FOR GAUGING THREADS ON WORK PIECES

John J. Parker and London T. Morawski, Detroit, Mich.

Application August 21, 1953, Serial No. 375,652

7 Claims. (Cl. 33—199)

This invention relates to a tool for the checking of internal threads on work pieces.

The object of the invention is to provide a tool with relatively movable elements externally threaded, so that when in a predetermined position, the threads on the elements are substantially continuous for threaded engagement with the work. The relatively movable elements of the tool are then caused to move relative to each other to engage the work piece threads in a non-rotatable manner. With the work piece and tool thus united relatively fixedly either the work piece or the tool may be supported and rotated and a gauge is applied to the other to thus check the concentricity of the internal threads of the work piece relative to the body of the work piece.

The tool of the present invention also serves as a work holder. In this regard, the tool, when applied to the work, may be placed in a machine such as a lathe or the like and work may be performed on the work piece as the same is turned.

Tools made in accordance with the invention are disclosed in the accompanying drawings:

Fig. 1 is a view of a tool showing the same partly in elevation and partly in section and illustrating the general structure thereof.

Fig. 2 is a view taken substantially on line 2—2 of Fig. 1 showing the segmental structure of the elements.

Fig. 3 is a detail section taken substantially on line 3—3 of Fig. 2.

Fig. 4 is a view of another form of tool showing the same partly in elevation and partly in section.

Fig. 5 is a view taken substantially on line 5—5 of Fig. 4 showing the segmental structure of the elements.

Fig. 6 is a detail view showing one form of structure.

Fig. 7 is a view similar to Fig. 6 showing a modified form of structure.

Fig. 8 is a view partly in side elevation and partly in section illustrating a further form.

Figure 9:
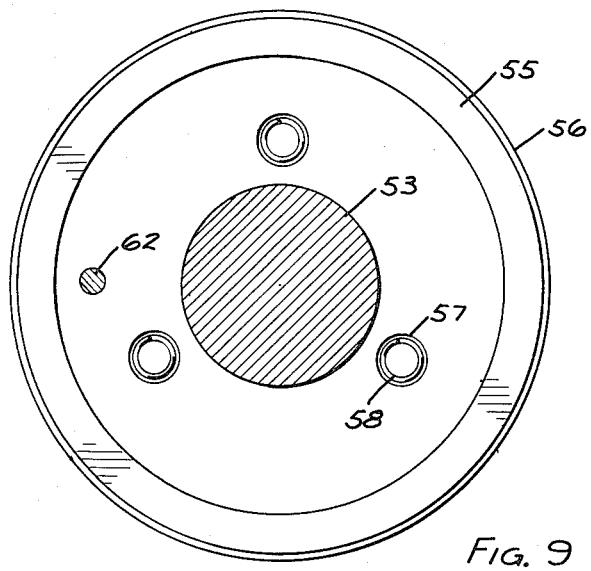
Fig. 9 is a sectional view taken substantially on line 9—9 of Fig. 8 showing structure of the tool.
Figure 10:
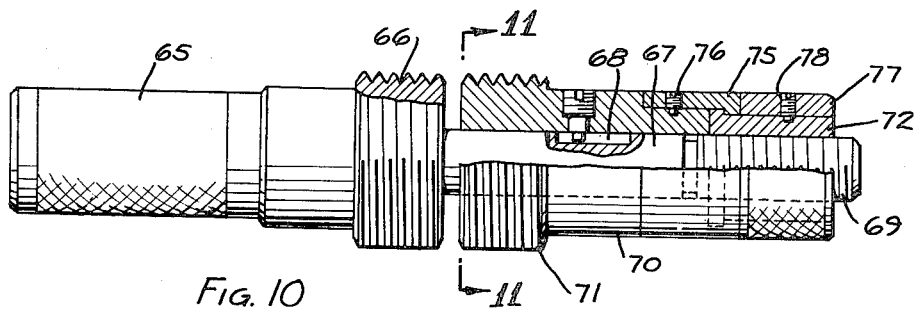
Fig. 10 is a view partly in elevation and partly in section showing a still further form of tool.
Figure 11:
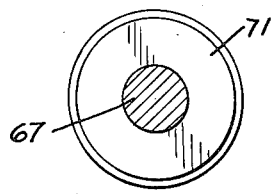
Fig. 11 is a sectional view taken on line 11—11 of Fig. 10.

The tool, as shown in Fig. 1, has a member 1 provided with an extending stud 2. This member 1 is formed with a plurality of axially extending segments 4 provided with external threads and between the segments the member has reduced portions as indicated at 5. A second member 7 has on its periphery a plurality of segments 9 provided with external threads and a hub portion 10 rotatably fitted on the stud 2. These two members are assembled together, as shown in Fig. 1, with the segments 9 interfitting between the segments 4. The segments are preferably arranged to have some clearances with respect to each other, as indicated in Fig. 2, and to keep the members 1 and 7 from relative rotation, the member 1 is provided with a pin at 12 which may be held by a screw 13 and which slidably fits in an aperture 15 in the member 7. The two members are provided with matching recesses 17 and 18 with each pair of recesses containing a coil spring 20. Thus the two members are relatively slidable axially by reason of the hub portion 10 on the stud 2 and are urged normally away from each other by the springs and held against relative rotation by the pin 12.

The stud 2 projects beyond the hub 10 and is provided with external threads 21 upon which is mounted an internally threaded adjusting nut or knob 22. Secured to the end of the stud 2 is a back plate or washer 23 and the adjusting nut 22 is thus disposed between the back plate 23 and the end face 24 of the hub 2. The hub is provided with an accurate peripheral surface 25 against which the actuator of a gauge 26 may be placed.

The threads on the segments 4 and 9 are preferably cut or otherwise formed with the two members 1 and 7 assembled together and accurately positioned. A preferred manner of doing this is to turn the nut 22 relative to the member 7 to project the member 1 to the left, as Fig. 1 is viewed, until the back plate 23 is firmly against the nut 22. This is the position shown in Fig. 1. Thus, when the threads on the segments are cut there is, in effect, a complete single thread formed on the peripheral surfaces of the several segments. It would, of course, be observed that the nut may be turned to retract the member 1 to the right, as Fig. 1 is viewed, relative to the member 7.

In using the tool the nut 22 is adjusted until the back plate 23 is firmly against the nut and then the tool is threaded with the internal threads of a work piece W. The threads on the segments are, of course, made very accurately and when threaded into the work piece, the nut is turned to shift the members 1 and 7 axially to cause the threads to shift axially and to tightly grip the threads of the work piece. The tool is thus tightened to the work piece to firmly grip the same and prevent relative rotation between the work piece and the tool during subsequent testing or gauging.

The tool is thus located on the work piece by its internal threads and the relative position of the work piece and the tool is determined by the condition of the internal thread. To check the threads the work piece may be placed in a suitable machine having gripping devices 27 and rotated on its axis and the gauge 26 is applied to the accurate circumferential surface 25. With the work piece thus rotated accurately on its axis, the tool will likewise rotate accurately on its axis if the internal threads of the work piece are accurately formed. Any defect in the threads of the work piece which throws the tool off center, so to speak, relative to the work piece, will be indicated by the gauge. Such defect may be lack of concentricity. In this manner the accuracy of the threads on the work piece can be determined and work pieces rejected if any inaccuracies of the thread exceed the permitted tolerances.

The drawing illustrates a V-thread but the tool may be constructed for work pieces with other threads, such as square threads, Acme threads, or buttress threads.

In the form shown in Fig. 4, one member 30 has a handle portion 31, an intermediate portion 32, having a surface for receiving a gauge (not shown), and segments 34 with external threads. Extending from the segments is a stud portion 35 provided with a groove 36 which may extend axially, as shown in Fig. 6, and a threaded end portion 37. The extreme ends may be formed to receive pintles such as the tail stock of the machine, for rotatably mounting the tool. In using this tool the gauge is to be applied to the work piece.

A second member 40 is slidably mounted on the portion 35 and it has a threaded portion with segments 41 therein, a coil spring disposed in each pair of facing recesses for urging the members axially relative to each other, an adjusting nut threaded to one member and reacting against the other and operable to urge the members axially against the springs, a pin on one member, the other member having an aperture for slidably receiving the pin to hold the members against relative rotation, the threads on the segments forming a substantially complete thread formation when the members are in a predetermined axial position, so that the tool may be threaded into the internal threads of the work piece, the nut being operable to shift the members axially to cause the threads on the segments to grip and bind with the threads on the work piece whereby the tool and work piece are held against relative rotation, so that, considering the work piece on the one hand and the tool on the other, one may be supported and rotated on its axis and a gauge applied to the other, to thus gauge the concentricity of the internal threads of the work piece relative to the body thereof.

4. A tool for use in gauging the concentricity of threads of a work piece relative to the body of a work piece comprising, a first member having a threaded portion, a second member having a threaded portion, means mounting the members on a common axis for relative axial movement non-rotatably, an adjusting nut threaded on one member and reacting against the other member and operable to shift the members relatively axially, the threaded portions of the members forming a substantially complete thread formation when the members are in a predetermined axial position relative to each other so that the same may be threaded on to threads of a work piece and the tool thereby secured to the work piece, the nut being operable to axially shift the members to cause said threaded portions to engage and grip the threads of the work piece to hold the work piece and tool against relative rotation, so that, considering the work piece on the one hand and the tool on the other hand, one may be held and rotated on a fixed axis and a gauge applied to the other for gauging the concentricity of the threads of the work piece relative to the body thereof.

5. A tool for use in gauging the concentricity of internal threads of a work piece relative to the body of a work piece comprising, a first member having an externally threaded portion and an axially extending stud portion, a second member having an externally threaded portion and a hub portion mounted on said stud portion, means for holding the members against free relative rotation and for relative movement axially, a nut threaded on one member and reacting against the other member and operable to shift the members axially, the externally threaded portions of the members forming a substantially complete thread formation when the members are in a predetermined relative axial position so that the threaded formation may be threaded into the internal threads of the work piece and the tool thereby secured to the work piece, the nut being operable to shift the members and cause the threaded portions thereof to bind against the internal threads of the work piece and hold the work piece and tool against relative rotation, whereby, considering the work piece on the one hand and the tool on the other hand, one may be supported and rotated in a fixed axis and a gauge applied to the other to thus gauge the concentricity of the internal threads of the work piece relative to the body thereof.

6. A tool for use in gauging the concentricity of internal threads of a work piece relative to the body of a work piece comprising, a first member having an externally threaded portion, a second member having an externally threaded portion, the first member having a stud-like projection, the second member having a hub portion mounted on the projection so that the members may shift axially, means holding the members together against free relative rotation, a nut threeaded on one of the members and reacting against the other member and operable to shift the members relatively axially, the threaded portions being disposed in face to face relationship and the threads thereon forming a substantially complete thread formation when the members are in a predetermined relative axial position, so that the tool may be threaded into the internal threads of the work piece, the nut being operable to shift the members to cause the threads thereon to grip the internal threads of the work piece and hold the work piece and tool against relative rotation, whereby, considering the work piece on the one hand and the tool on the other hand, one may be supported and rotated on a fixed axis and a gauge applied to the other for gauging the concentricity of the internal threads of the work piece relative to the body thereof.

7. The tool as substantially described in claim 6 characterized in that the threaded portions of the first and second members face each other and have aligned recesses therein and a coil spring pocketed in the aligned recesses for normally urging the threaded portions away from each other.

References Cited in the file of this patent

UNITED STATES PATENTS

| | | |
|---|---|---|
| 1,535,098 | Buckingham | Apr. 28, 1925 |
| 1,822,027 | Hartness | Sept. 8, 1931 |
| 1,822,028 | Hartness | Sept. 8, 1931 |
| 2,370,503 | Straw | Feb. 27, 1945 |
| 2,665,136 | Fallon | Jan. 5, 1954 |

Feb. 26, 1957   R. H. BLACK   2,782,522
THREAD GAUGE
Filed Sept. 14, 1953
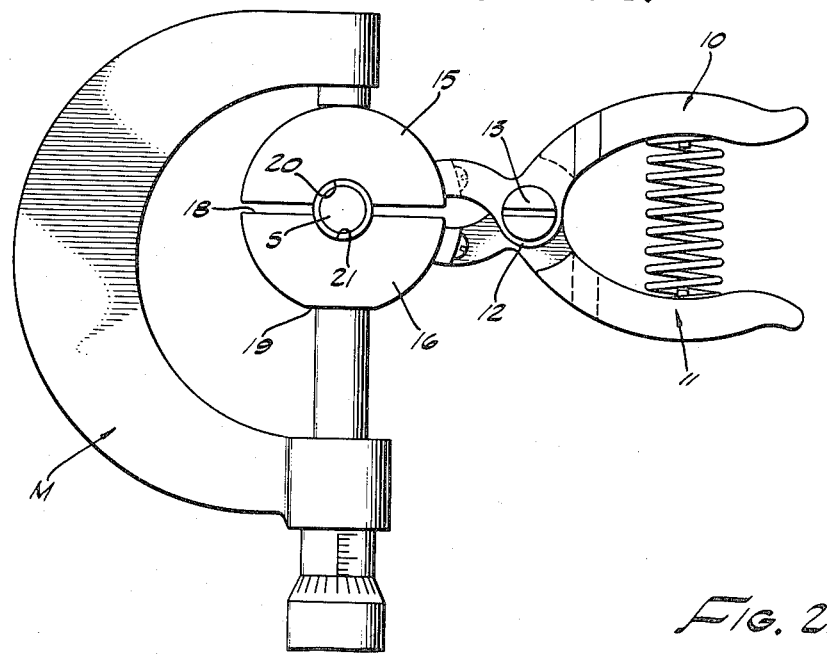
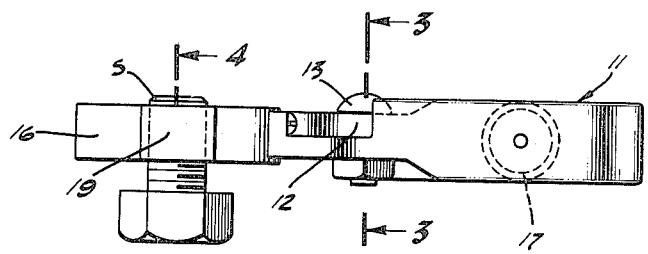
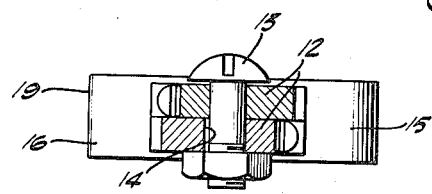
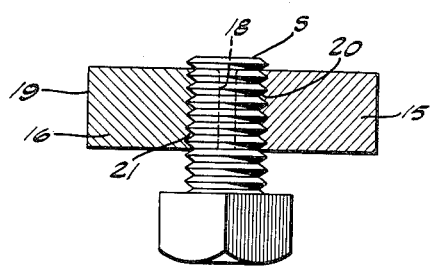
ROBERT H. BLACK
INVENTOR.
BY *Hazard & Miller*
ATTORNEYS